Patented May 21, 1940

2,201,814

UNITED STATES PATENT OFFICE 2,201,814

PROCESS OF DYEING

John Gwynant Evans, Henry Alfred Piggott, and Clarence Sydney Woolvin, Blackley, Manchester, England, assignors to Imperial Chemical Industries Limited, a corporation of Great Britain No Drawing. Application April 11, 1935, Serial No. 15,910. In Great Britain April 19, 1934

6 Claims. (Cl. 8—74)

In U. S. A. Serial No. 649,438 a process is described for increasing the fastness of dyeings on textile materials composed of cellulose, natural or regenerated, or of silk, or of wool, or of mixtures of these materials, by treating the materials before or after the dyeing operation with a dilute aqueous solution of certain heterocyclic ammonium salts.

The present invention relates to an improvement in or modification of that described in U. S. A. Serial No. 649,438.

The process of the present invention is by treating the said materials, according to the method described in the specification mentioned, with an aqueous solution of a sulphonium or phosphonium salt containing one alkyl radical of at least 10 carbon atoms. To the substance used the general formula R—X—S(R'R'')—Ac or R—X—P(R'R''R''')—Ac may be applied. Here R stands for an alkyl radical containing at least 9 carbon atoms; R', R'' and R''' stand for lower alkyl radicals, e. g. methyl or ethyl, or an aralkyl radical, e. g. benzyl; X stands for any element or group of elements capable of linking together into a stable chemical compound the requisite alkyl radical R and the sulphonium or phosphonium salt grouping, and Ac is the radical of an inorganic acid or of an organic sulphonic or carboxylic acid. As examples of linking groups (X) may be quoted —CH$_2$—, —C$_6$H$_4$—, —NH—CH$_2$—, NH—CO—CH$_2$, —CO—NH—CH$_2$, —O—CO—CH$_2$—, —CO—O—CH$_2$—, and O—CH$_2$—CH$_2$—.

As examples of the preparation of typical compounds which may be used according to the invention we give the following:

Example A 100 parts of methyl cetyl sulphide (made as described below) and 47 parts of dimethyl sulphate are heated together for 1 hour at 100° C. On cooling, the product slowly sets to a white crystalline mass of dimethylcetylsulphonium methyl sulphate. It may be purified by crystallising from acetone.

Methyl cetyl sulphide is made as follows: 100 parts of cetyl mercaptan, 450 parts of 2 N sodium hydroxide and 500 parts of water are mixed and 95 parts of dimethyl sulphate are added by stirring vigorously in 2 hours. The liquid is then distilled in steam, the distillate extracted with ether, and the residue from evaporation of the extract distilled. Methyl cetyl sulphide is obtained as a colourless liquid, B. P. 210–214°/20–30 mm.

Example B 100 parts of benzyl cetyl sulphide (made as described below) and 37 parts of dimethyl sulphate are heated together at 100° C. until a sample dissolves completely in water. The mixture is then cooled, when it sets to a white crystalline mass of methylbenzylcetylsulphonium methyl sulphate: this may be purified by crystallising from acetone, from which minute colourless plates, M. P. 75–80° C. are obtained.

Benzyl cetyl sulphide is made as follows: 8.5 parts of sodium are dissolved in 100 parts of methanol and 100 parts of cetyl mercaptan (Fridau, Annalen, 1852, 83, 18) are added. The mixture is boiled and 47 parts of benzyl chloride are added in one hour. The mixture is cooled and water is added until no more oil separates: the oil is extracted with ether, and the ethereal extract distilled in a vacuum, the fraction B. P. 160–180°/18 mm. being collected.

Example C

A mixture of 264 parts of methyl dodecyl sulphide (prepared as described below) and 165 parts of dimethyl sulphate is heated at 90–100° C. until water-soluble, and then allowed to cool. Dimethyldodecylsulphonium methyl sulphate sets as a solid mass, and may be recrystallised from acetone. It dissolves in water to a colourless foaming solution with good wetting properties.

Methyl dodecyl sulphide is made from dodecyl mercaptan in the same way as methyl cetyl sulphide is made from cetyl mercaptan in Example A. Dodecyl mercaptan itself is a new compound, it may be made in the same way as cetyl mercaptan (loc. cit.).

Example D

A mixture of 10 parts of dimethyl sulphate and 40 parts of dicetyl sulphide is heated at 100° C. until the product is completely soluble in water. On cooling a hard crystalline mass of dicetylmethylsulphonium methyl sulphate is obtained; this is purified by crystallising from acetone, when it has M. P. 130–134° C.

The invention is illustrated but not limited by the following examples:

Example 1

Cotton fabric is dyed in the cold for one hour with Chlorazol Sky Blue FF (6% on the weight of the fabric) and rinsed after dyeing, is immersed in a 0.1% aqueous solution of dimethylhexadecylsulphonium methosulphate (see Example 1 of copending application Ser. No. 28,013, by H. A. Piggott) in sufficient volume to contain 2% of this compound calculated on the weight of fabric and is agitated for 20 minutes at room temperature (18° C.).

It is then thoroughly rinsed and dried. The fabric so treated is much faster to water, perspiration and acid cross dyeing.

Instead of the compound mentioned, benzylethyldodecylsulphonium chloride or stearamidobenzyldimethylsulphonium chloride may be used.

Benzylethyldodecylsulphonium chloride is prepared by heating ethyl dodecyl sulphide (from dodecylmercaptan and ethyl chloride in presence of caustic soda) with benzyl chloride; and stearamidobenzyldimethylsulphonium methosulphate is made by condensing p-aminobenzyl methyl sulphide with stearic acid, and converting the product into the sulphonium salt by heating with dimethyl sulphate. p-Aminobenzyl methyl sulphide is made from p-nitrobenzylmercaptan by methylation and reduction as described by Gabriel and Stelzner (Berichte d. Deutsche Chem. Ges. 1896, vol. 29, p. 163) for corresponding p-compound.

*Example 2*

Cotton fabric (1 part) dyed in the cold for 1 hour with a 60% shade of Chlorazol Fast Red K (Colour Index No. 278) is immersed in 20 parts of a solution containing per 1000 parts of water, 1 part of triethylhexadecylphosphonium bromide, prepared by reacting triethylphosphine with cetyl bromide in ethereal solution at 80° C. for 14 hours. The dyed material is agitated in the above solution for 20 minutes at room temperature and is then rinsed thoroughly and dried.

The fabric so treated is much faster to water, perspiration and acid cross dyeing.

Similar results may be obtained by using triethyldodecylphosphonium bromide in place of triethylhexadecylphosponium bromide. It is prepared by reacting triethylphosphine with dodecyl bromide in ethereal solution at 80° C. for 14 hours.

It will be understood that our invention is susceptible of wide variation in details, to the same extent as disclosed in conjunction with heterocyclic ammonium salts in U. S. application Ser. No. 649,438, above referred to. Thus, our invention is applicable to improve the fastness of dyeings on various textile materials, such as cellulose, either natural or regenerated, wool, silk, or mixtures of these. It may be practiced with various azo colors, whether direct or acid. And it may be practiced by applying the novel mordants to the fiber either before or after the dyeing operation.

We claim:
1. A process for increasing the fastness of dyeings upon textile fiber with azo dyes, which comprises treating the textile fiber in a dilute aqueous solution of a salt selected from the group consisting of sulfonium and phosphonium salts of inorganic acids, the sulfur or phosphorus atom, respectively, being further substituted to its full valency by organic radicals, at least one of which contains an alkyl chain of at least 10 carbon atoms.

2. A process for increasing the fastness of dyeings upon textile fiber with azo dyes, which comprises treating the textile fiber in optional order with a dyeing bath and an aqueous bath containing dissolved therein a salt of the general formula R—Y—Ac wherein Y is a dialkyl-sulfonium or trialkyl phosphonium radical, Ac is the radical of an inorganic acid or of an organic sulfonic or carboxylic acid, while R is an organic radical containing an alkyl radical of at least 9 carbon atoms, and a total of at least 10 carbon atoms.

3. A process for improving the fastness of dyeings produced on cotton material by means of direct cotton dyestuffs, which comprises aftertreating the dyed material with an aqueous bath containing dissolved therein a quaternary organic phosponium salt of an inorganic acid, in which one of the organic substituents on the phosphorus atom contains an alkyl radical of at least 9 carbon atoms.

4. A process for improving the fastness of dyeings produced on cotton material by means of direct cotton dyestuffs, which comprises aftertreating the dyed material with an aqueous bath containing dissolved therein a tertiary organic sulfonium salt of an inorganic acid, in which one of the organic substituents on the sulfur atom contains an alkyl radical of at least 9 carbon atoms.

5. A process of dyeing textile fibrous materials which comprises pretreating the same in an aqueous bath containing dissolved therein a quaternary organic phosphonium salt of an inorganic acid, containing an alkyl radical of at least ten carbon atoms, and thereafter dyeing the said material with a direct azo dye.

6. A process of dyeing textile fibrous materials which comprises pretreating the same in an aqueous bath containing dissolved therein a tertiary organic sulfonium salt of an inorganic acid containing an alkyl radical of at least ten carbon atoms, and thereafter dyeing the said material with a direct azo dye.

JOHN GWYNANT EVANS.
HENRY ALFRED PIGGOTT.
CLARENCE SYDNEY WOOLVIN.

---

CERTIFICATE OF CORRECTION.

Patent No. 2,201,814.   May 21, 1940.

JOHN GWYNANT EVANS, ET AL.

It is hereby certified that error appears in the printed specification of the above numbered patent requiring correction as follows: Page 2, first column, line 25, for "p-compound" read --o-compound--; and that the said Letters Patent should be read with this correction therein that the same may conform to the record of the case in the Patent Office.

Signed and sealed this 25th day of June, A. D. 1940.

ample 1 of copending application Ser. No. 28,013, by H. A. Piggott) in sufficient volume to contain 2% of this compound calculated on the weight of fabric and is agitated for 20 minutes at room temperature (18° C.).

It is then thoroughly rinsed and dried. The fabric so treated is much faster to water, perspiration and acid cross dyeing.

Instead of the compound mentioned, benzylethyldodecylsulphonium chloride or stearamidobenzyldimethylsulphonium chloride may be used.

Benzylethyldodecylsulphonium chloride is prepared by heating ethyl dodecyl sulphide (from dodecylmercaptan and ethyl chloride in presence of caustic soda) with benzyl chloride; and stearamidobenzyldimethylsulphonium methosulphate is made by condensing p-aminobenzyl methyl sulphide with stearic acid, and converting the product into the sulphonium salt by heating with dimethyl sulphate. p-Aminobenzyl methyl sulphide is made from p-nitrobenzylmercaptan by methylation and reduction as described by Gabriel and Stelzner (Berichte d. Deutsche Chem. Ges. 1896, vol. 29, p. 163) for corresponding p-compound.

*Example 2*

Cotton fabric (1 part) dyed in the cold for 1 hour with a 60% shade of Chlorazol Fast Red K (Colour Index No. 278) is immersed in 20 parts of a solution containing per 1000 parts of water, 1 part of triethylhexadecylphosphonium bromide, prepared by reacting triethylphosphine with cetyl bromide in ethereal solution at 80° C. for 14 hours. The dyed material is agitated in the above solution for 20 minutes at room temperature and is then rinsed thoroughly and dried.

The fabric so treated is much faster to water, perspiration and acid cross dyeing.

Similar results may be obtained by using triethyldodecylphosphonium bromide in place of triethylhexadecylphosponium bromide. It is prepared by reacting triethylphosphine with dodecyl bromide in ethereal solution at 80° C. for 14 hours.

It will be understood that our invention is susceptible of wide variation in details, to the same extent as disclosed in conjunction with heterocyclic ammonium salts in U. S. application Ser. No. 649,438, above referred to. Thus, our invention is applicable to improve the fastness of dyeings on various textile materials, such as cellulose, either natural or regenerated, wool, silk, or mixtures of these. It may be practiced with various azo colors, whether direct or acid. And it may be practiced by applying the novel mordants to the fiber either before or after the dyeing operation.

We claim:
1. A process for increasing the fastness of dyeings upon textile fiber with azo dyes, which comprises treating the textile fiber in a dilute aqueous solution of a salt selected from the group consisting of sulfonium and phosphonium salts of inorganic acids, the sulfur or phosphorus atom, respectively, being further substituted to its full valency by organic radicals, at least one of which contains an alkyl chain of at least 10 carbon atoms.

2. A process for increasing the fastness of dyeings upon textile fiber with azo dyes, which comprises treating the textile fiber in optional order with a dyeing bath and an aqueous bath containing dissolved therein a salt of the general formula R—Y—Ac wherein Y is a dialkyl-sulfonium or trialkyl phosphonium radical, Ac is the radical of an inorganic acid or of an organic sulfonic or carboxylic acid, while R is an organic radical containing an alkyl radical of at least 9 carbon atoms, and a total of at least 10 carbon atoms.

3. A process for improving the fastness of dyeings produced on cotton material by means of direct cotton dyestuffs, which comprises aftertreating the dyed material with an aqueous bath containing dissolved therein a quaternary organic phosponium salt of an inorganic acid, in which one of the organic substituents on the phosphorus atom contains an alkyl radical of at least 9 carbon atoms.

4. A process for improving the fastness of dyeings produced on cotton material by means of direct cotton dyestuffs, which comprises aftertreating the dyed material with an aqueous bath containing dissolved therein a tertiary organic sulfonium salt of an inorganic acid, in which one of the organic substituents on the sulfur atom contains an alkyl radical of at least 9 carbon atoms.

5. A process of dyeing textile fibrous materials which comprises pretreating the same in an aqueous bath containing dissolved therein a quaternary organic phosphonium salt of an inorganic acid, containing an alkyl radical of at least ten carbon atoms, and thereafter dyeing the said material with a direct azo dye.

6. A process of dyeing textile fibrous materials which comprises pretreating the same in an aqueous bath containing dissolved therein a tertiary organic sulfonium salt of an inorganic acid containing an alkyl radical of at least ten carbon atoms, and thereafter dyeing the said material with a direct azo dye.

JOHN GWYNANT EVANS.
HENRY ALFRED PIGGOTT.
CLARENCE SYDNEY WOOLVIN.

---

CERTIFICATE OF CORRECTION.

Patent No. 2,201,814.  May 21, 1940.

JOHN GWYNANT EVANS, ET AL.

It is hereby certified that error appears in the printed specification of the above numbered patent requiring correction as follows: Page 2, first column, line 25, for "p-compound" read --o-compound--; and that the said Letters Patent should be read with this correction therein that the same may conform to the record of the case in the Patent Office.

Signed and sealed this 25th day of June, A. D. 1940.